United States Patent [19]

Zahn et al.

[11] 4,024,115

[45] May 17, 1977

[54] MANUFACTURE OF POLYAMIDE FILM CONTAINING ESTER OF AN ALIPHATIC ALCOHOL

[75] Inventors: Erwin Zahn, Ludwigshafen; Claus Cordes, Weisenheim; Georg Nikolaus Simon, Limburgerhof; Hans-Peter Weiss, Altrip, all of Germany

[73] Assignee: BASF Aktiengesellschaft, Ludwigshafen, Germany

[22] Filed: Oct. 14, 1975

[21] Appl. No.: 622,103

[30] Foreign Application Priority Data

Oct. 25, 1974 Germany ............................ 2450788

[52] U.S. Cl. ........................... 260/78 S; 260/30.8 R; 260/31.2 N; 260/31.8 R; 260/78 A; 260/78 L
[51] Int. Cl.$^2$ ......................................... C08G 69/46
[58] Field of Search ........................ 260/78 S, 78 R

[56] References Cited

UNITED STATES PATENTS

| | | | |
|---|---|---|---|
| 2,665,443 | 1/1954 | Simon et al. ...................... | 260/78 S |
| 3,341,343 | 9/1967 | Beiswanger et al. .............. | 260/78 S |
| 3,459,251 | 8/1969 | Kibler ................................ | 260/78 S |
| 3,839,530 | 10/1974 | Bingham et al. .................. | 260/78 S |

OTHER PUBLICATIONS

Chemical Abstracts, vol. 76, 1972, 15484d.

Primary Examiner—Harold D. Anderson
Attorney, Agent, or Firm—Keil, Thompson & Shurtleff

[57] ABSTRACT

A film of poly(hexamethylenediamine adipate) (nylon 6,6) which contains from 0.01 to 2 per cent by weight of an ester of an aliphatic alcohol of 4 to 10 carbon atoms.

6 Claims, No Drawings

MANUFACTURE OF POLYAMIDE FILM CONTAINING ESTER OF AN ALIPHATIC ALCOHOL

Because of its good properties, polyamide film finds many uses and is increasing in importance. It is manufactured by, e.g., the film-blowing process or, far more frequently, by the flat film process. To manufacture flat film, the polymeric starting material is melted, for example in an extruder, and fed, as a molten film, through a slit die onto a chilled receiving roller, on which the film solidifies. The film thus obtained is passed over several rollers and is finally wound up or is directly processed further, e.g., converted to laminates.

Amongst polyamides manufactured industrially, poly(hexamethylenediamine adipate), hereinafter referred to as nylon 6,6, has particularly interesting properties, e.g. a high melting point, high rigidity and excellent transparency. On the other hand, it is particularly the manufacture of nylon 6,6 flat film which presents difficulties. During manufacture of the film, a deposit originating from the more volatile components of nylon 6,6 forms on the rollers, especially on the chilled receiving roller, and on the film itself. During the run this deposit progressively interferes with the heat transfer between the rollers and the film and adversely affects the surface quality of the film and the uniformity with which the film cools and solidifies. Further disadvantages result from the fact that the deposit does not form uniformly and in part adheres to the roller and in part to the film. This causes considerable trouble and gives an uneven, blotchy or streaky film.

Attempts have already been made to avoid these disadvantages. Thus, e.g., the chilled receiving roller can be replaced by a fresh roller after a certain length of run, or the deposit which forms on the roller can be rubbed off manually during the run. Whilst this restricts the adverse effects to a tolerable level, both measures are completely unsatisfactory. For this reason, British Pat. No. 1,224,702 and German Published Application Patent No. 2,149,824 propose measures intended to clean the receiving roller continuously and uniformly. However, these processes are very expensive and interfere with the uniform temperature control of the chilled receiving roller, whilst such control is an important factor in film quality.

We have now found, surprisingly, that satisfactory and uniform flat film of nylon 6,6 can be manufactured trouble-free without taking such expensive measures, by using a process for the manufacture of nylon film, wherein nylon 6,6 which contains from 0.01 to 2 percent by weight, and preferably from 0.1 to 0.5 percent by weight, of an ester of an aliphatic alcohol of 4 to 10 carbon atoms, is converted to film by conventional methods.

To carry out the process, the additives proposed according to the invention are added to the starting materials for the film, before these are converted to film. For this purpose, the additives are generally admixed during manufacture of the polymer or admixed to the melt in a subsequent processing stage. However, it is also possible to mix the additives with the polymers without melting the latter for this purpose. The additives can also be introduced separately from the starting materials for the film into, e.g., the extruder used for the manufacture of the film, and only be admixed to the granules or melt at that stage.

Suitable starting materials for carrying out the process of the invention are polyamides based on hexamethylenediamine and adipic acid; in addition, other polyamide-forming monomers, e.g. diamines, dicarboxylic acids, lactams and aminocarboxylic acids, in amounts of up to 30%, may be used as components for the manufactuure of the polyamides. Particularly suitable polyamides for the process of the invention are those which retain, from the process of manufacture, a small proporton of unconverted monomer and low molecular weight reaction products. Suitable polyamides for the process of the invention have a relative viscosity of from 2.4 to 4.0, preferably from 2.5 to 3.5. The relative viscosity is the quotient of the flow times, in a capillary viscometer at 25° C, for a 1% strength solution of the polyamide in 96% strength sulfuric acid and of pure 96% strength sulfuric acid.

The starting materials used may also contain conventional additives such as molecular weight regulators, light stabilizers, heat stabilizers and antioxidants, as well as pigments and dyes; in addition, the conventional assistants for film manufacture, e.g. antiblocking agents and the like, may be used.

The conventional equipment for the manufacture of flat film may be used for carrying out the process of the invention and the film obtained can be, e.g., monoaxially or biaxially stretched, laminated, coated or further processed in other appropriate ways, in each case using conventional methods.

Suitable additives to be used according to the invention are the esters of monobasic or polybasic organic carboxylic acids or sulfonic acids with monohydric or polyhydric cyclic or non-cyclic, aliphatic alcohols, in particular of 4 to 10 carbon atoms. Not only individual esters, but also mixtures of different esters of the above type may be used. Esters based on monoalcohols of 8 carbon atoms, especially 2-ethylhexanol-1, are particularly preferred. In a particularly advantageous embodiment, the esters of 2-ethylhexanol-1 with p-hydroxybenzoic acid and/or adipic acid are used.

The process of the invention simply and effectively avoids the formation of an objectionable deposit on the rollers when manufacturing flat film of nylon 6,6. Expensive cleaning operations, and complicated and at times disadvantageous mechanical devices for continuously cleaning the rollers, are avoided. In addition, stoppages for cleaning the rollers or changing them are avoided. The nylon 6,6 films obtained by the process of the invention are, surprisingly, very transparent and free from blotches and streaks, and are distinguished by very high uniformity and constancy of film thickness, of optical and mechanical properties, and of surface quality. A further advantage of the process of the invention is that the extruder used for melting the material for the manufacture of the film operates more uniformly and without pulsation, and that higher throughputs are achievable.

EXAMPLES

A Barmag extruder of 90 mm diameter and length 25 D was used to carry out the experiments. The extruder was fitted with a three-zone screw divided up in the ratio of 8 D : 4 D : 13 D. The flight depth ratio was 13 mm : 37 mm. The slit die used was a commercially available Johnson die 800 mm wide, with an 0.5 mm gap. The temperatures in the individual heating zones of the barrel were - starting from the intake zone - 270°, 280°, 285°, 270°, 270° and 270° C. The adaptor and die were kept at 270° C.

The receiving chill roller had a diameter of 450 mm and was kept at 92° C.

The film produced was drawn off at a speed of 38 m/minute. It was 25μ thick and 700 mm wide.

a. The extruder was fed with nylon 6,6 of relative viscosity 3.43. Pressure fluctuations in the extruder were observed. Furthermore, a progressively thicker deposit formed on the rollers and the film. After an extended period of production, the film was non-uniform in respect of thickness and transparency.

b. The extruder was fed as in case (a) except that the granules also contained 0.5% by weight of the diester of 2-ethylhexanol-1 with adipic acid. No pressure fluctations in the extruder were observed and the rollers and the film remained free from a deposit even after an extended period of production. The film was of uniform transparency and thickness.

c. The extruder was fed as in case (a) except that the granules also contained 0.5% by weight of the ester of 2-ethylhexanol-1 with p-hydroxybenzoic acid. No pressure fluctations in the extruder were observed and the rollers and the film remained free from a deposit even after an extended period of production. The film was of uniform transparency and thickness.

The haze value according to ASTM D 1003 was measured on the films from (a), (b) and (c) after the film line had run for certain fixed times. The following values were found:

| Time of running of film line | Haze value according to ASTM D 1003, measured on the film | | |
|---|---|---|---|
| | (a) | (b) | (c) |
| 15 mins | 8.1 | 6.5 | 6.1 |
| 120 mins | 20.9 | 6.4 | 7.5 |

We claim:
1. A polyamide film consisting essentially of a hexamethylenediamine adipate polymer and additionally containing from 0.01 to 2 percent by weight based on the polymer, of an ester of octanol with adipic acid or p-hydroxybenzoic acid.

2. A film as set forth in claim 1 wherein the content of the ester is from 0.1 to 0.5 percent by weight, based on the polymer.

3. A film as claimed in claim 1, wherein the octanol is 2-ethylhexanol-1.

4. A film as set forth in claim 1, wherein the polymer consists of poly(hexamethylenediamine adipate) having a relative viscosity of from 2.4 to 4.0, said viscosity determined as the quotient of the flow times of a 1% strength solution of the polyamide in 96% strength sulfuric acid and of pure 96% strength sulfuric acid in a capillary viscometer at 25° C.

5. A process for the manufacture of polyamide film, wherein from 0.01 to 2 percent by weight of an ester of octanol with adipic acid or p-hydroxybenzoic acid is added to a hexamethylenediamine adipate polymer and the resulting material is converted to film.

6. A process as set forth in claim 5, wherein the ester is added to the polymer during its manufacture or is added to a melt of the polymer in a subsequent processing stage.

* * * * *